(12) United States Patent
Gibala et al.

(10) Patent No.: US 8,401,061 B2
(45) Date of Patent: Mar. 19, 2013

(54) METHOD AND APPARATUS FOR REMOTELY TESTING A DIGITAL SUBSCRIBER LINE ACCESS MULTIPLEXER

(75) Inventors: Jeffrey A. Gibala, North Huntingdon, PA (US); Matthew G. Cimbala, Saxonburg, PA (US); Thomas R. Schneider, Jr., Beaver Falls, PA (US); Regis J. Nero, Jr., Export, PA (US); Gregory L. Quiggle, Cranberry Township, PA (US)

(73) Assignee: Tollgrade Communications, Inc., Cranberry Township, PA (US)

( * ) Notice: Subject to any disclaimer, the term of this patent is extended or adjusted under 35 U.S.C. 154(b) by 675 days.

(21) Appl. No.: 12/307,824

(22) PCT Filed: Jul. 12, 2007

(86) PCT No.: PCT/US2007/073303
§ 371 (c)(1),
(2), (4) Date: Feb. 9, 2010

(87) PCT Pub. No.: WO2008/008866
PCT Pub. Date: Jan. 17, 2008

(65) Prior Publication Data
US 2010/0128768 A1 May 27, 2010

Related U.S. Application Data

(60) Provisional application No. 60/830,568, filed on Jul. 13, 2006.

(51) Int. Cl.
*H04L 5/16* (2006.01)

(52) U.S. Cl. ........ 375/222; 375/219; 375/224; 375/229; 375/254; 375/257

(58) Field of Classification Search .................. 375/222, 375/224, 219, 229, 254, 257
See application file for complete search history.

(56) References Cited

U.S. PATENT DOCUMENTS

| | | | |
|---|---|---|---|
| 6,584,148 B1 | 6/2003 | Zitting et al. | |
| 6,831,975 B1 | 12/2004 | Easwaran et al. | |
| 6,839,383 B1 | 1/2005 | Karnes | |
| 6,873,685 B2 | 3/2005 | Chong | |
| 2004/0076166 A1* | 4/2004 | Patenaude | 370/401 |
| 2006/0093023 A1 | 5/2006 | Brown et al. | |

* cited by examiner

*Primary Examiner* — Dhaval Patel
(74) *Attorney, Agent, or Firm* — The Webb Law Firm

(57) ABSTRACT

A system and method for testing a modem of a digital subscriber line access multiplexer (DSLAM) includes a pair of modems communicatively coupled to each other by way of a communications path that includes a first DSL communication medium connected to one modem, a second DSL communication medium connected to the other modem, which is part of the DSLAM, and an Ethernet medium connected between the first and second DSL modems. DSL signals can be dispatched from the first (or second) modem via the first (or second) DSL communication medium for receipt by the second (or first) DSL modem via the second (or first) DSL communication medium, whereupon, DSL signals passing from the first DSL communication medium to the second DSL communication medium, or vice versa, are converted into Ethernet packets for transmission over the Ethernet medium and then back into DSL signals.

20 Claims, 5 Drawing Sheets

METHOD AND APPARATUS FOR REMOTELY TESTING A DIGITAL SUBSCRIBER LINE ACCESS MULTIPLEXER

BACKGROUND OF THE INVENTION

1. Field of the Invention

The present invention relates to testing of C-type modems of a digital subscriber line access multiplexer by way of a remotely provisioned R-type modem.

2. Description of Related Art

With reference to FIG. 1, a typical prior art architecture for DSL distribution from a service provider's Central Office (CO) 2 to each of one or more customers 4 is illustrated. Each customer 4 includes a so-called R-type DSL modem 6 (hereinafter "R modem 6") which is linked to a so-called C-type DSL modem 8 (hereinafter "C modem 8") located in a so-called Digital Subscriber Line Access Multiplexer (DSLAM) 10 disposed communicatively between CO 2 and each customer 4.

Each R modem 6 is connected to a corresponding C modem 8 located in DSLAM 10 via a DSL line 12, e.g., a twisted cable pair, that can be up to 18,000 feet in length. For each R modem 6 there is a corresponding C modem 8 in a DSLAM 10. Each DSLAM 10 is configured to house a plurality of C modems 8. Models of DSLAMs exist that have 10's, 100's or 1000's of C modems 8 that can service a corresponding number of R modems 6. When each C modem 8-R modem 6 pair is communicatively synchronized, a constant flow of DSL signal traffic exists between them in a manner known in the art. Each modem 6 and 8 is an intelligent device capable of decoding messages embedded in DSL signal(s), and responding to the messages or forwarding them further on in the network if warranted.

Each DSLAM 10 is operative for terminating DSL signals received from R modems 6 communicatively coupled to C modems 8 thereof via DSL lines 12, for aggregating any data residing on the received DSL signals onto a high speed Ethernet line 14, and for forwarding the aggregated data to CO 2. More specifically, an Ethernet switch 16 of each DSLAM 10 is operative for aggregating the data extracted from DSL signals received from R modems 6 communicatively coupled to C modems 8 thereof via DSL lines 12, and for combining said data onto the corresponding Ethernet line 14. Each Ethernet line 14 can be any suitable and/or desirable physical type and can use copper or fiber media, or some combination thereof. FIG. 1 shows a so-called Gigabit Ethernet (GigE) as high speed Ethernet line 14. However, this is not to be construed as limiting the invention.

Each Ethernet line 14 communicatively couples the corresponding Ethernet switch 16 of a DSLAM 10 to an Ethernet switch 18 located within CO 2. Ethernet switch 18 aggregates the data received via each Ethernet line 14 onto one higher speed Ethernet line 19. FIG. 1 shows a so-called 10 Gigabit Ethernet (10 GigE) line as the high speed Ethernet line 19. However, this is not to be construed as limiting the invention.

The architecture shown in FIG. 1 can be scaled by coupling any suitable and/or desirable number of DSLAMs 10 to CO 2 in the manner described above. For example, tens or hundreds of DSLAMs 10 could be communicatively coupled to CO 2 in the manner described above.

In order to facilitate testing of each C modem 8 thereof, each DSLAM 10 includes a switch matrix 20 which is responsive to commands received from Ethernet switch 16, which commands are received by Ethernet switch 16 via the corresponding Ethernet line 14. More specifically, each switch matrix 20 includes a plurality of switches configured and operative for enabling the DSL port of each C modem 8 to be connected, one-at-a-time, to a DSL test port 22 of DSLAM 10.

To facilitate testing of each C modem 8 of a particular DSLAM 10, an R modem 6', like the R modems 6 of each customer 4, is installed between the DSL test port 22 of the DSLAM 10 and an Ethernet test port 24 of DSLAM 10, the latter of which is coupled to Ethernet switch 16 of DSLAM 10.

With reference to FIG. 2 and with continuing reference to FIG. 1, each R modem 6' includes a line interface 26, an analog front end (AFE) 28, a digital signal processor (DSP) 30 and a microprocessor 32.

Line interface 26 of R 6' modem transformer couples R modem 6' to a DSL line 34 coupled between switch matrix 20 and the DSL port of R modem 6', splits the DSL signal into its upstream and downstream components, and amplifies the DSL signal. Line interface 26 then passes conditioned downstream signals to AFE 28. Upon receiving downstream signals from line interface 26, AFE 28 does some additional amplification and filtering, and digitizes said signals with 10-14 bit resolution at 18 Msamples/sec. The digitized signals are then sent to DSP 30. Upstream signals input into AFE 28 by DSP 30 as 10-12 bit digitized signals at 9 Msamples/sec are converted into analog DSL signals by AFE 28. These analog DSL signals are then sent to line interface 26 for amplification and coupling to DSL line 34.

DSP 30 decodes digitized signals received from AFE 28 into ATM cells or Ethernet packets and encodes ATM cells or Ethernet packets received from microprocessor 32 into discreet multi-tone (DMT) signals in accordance with ANSI Standard T1.413. The digitized signals passed between AFE 28 and DSP 30 are digitized DMT signals which are either being transmitted upstream or downstream.

ATM cells received by microprocessor 32 from DSP 30 must be packetized for transport over an Ethernet line 36 that runs between the Ethernet port of R modem 6' and Ethernet test port 24 of DSLAM 10. Microprocessor 32 does this function, removing data from the ATM cells, creating Ethernet packets with this data, and sending these Ethernet packets over Ethernet line 36. If microprocessor 32 receives Ethernet packets from DSP 30, it is not necessary that microprocessor 32 modify these Ethernet packets for transmission over Ethernet line 36. Accordingly, microprocessor 32 simply dispatches these Ethernet packets over Ethernet line 36.

While the foregoing description of the various functional blocks of R modem 6' focused primarily on the transmission of data downstream, it is believed that it would be apparent to one of ordinary skill in the art that the block diagram elements of R modem 6' can also be utilized to transmit data upstream. Accordingly, a detailed description of the transmission of data upstream will not be included herein.

In use of each R modem 6', a test system controller 38 coupled to Ethernet line 19, e.g., either directly or via an IP network 40, signals a desired switch matrix 20 via the corresponding Ethernet switch 16 to connect one C modem 8 of DSLAM 10 to DSL test port 22 thereof. At a suitable time thereafter, test system controller 38 causes the corresponding R modem 6' to establish DSL connectivity with the C modem 8 coupled to DSL test port 22 by switch matrix 20. Desirably, this DSL connectivity is an automated function between R modem 6' and the C modem 8 under test that requires no further intervention of test system controller 38.

Assuming DSL connectivity is established, at a suitable time, test system controller 38 can retrieve data regarding the DSL connectivity, such as, without limitation, maximum connectivity rate. Also or alternatively, test system controller 38 can cause Ethernet packets to be supplied to R modem 6' via Ethernet switch 16. R modem 6' converts these Ethernet packets into analog DSL signals which it transmits to the C modem 8 coupled to DSL test port 22. This C modem 8 converts the analog DSL signals into Ethernet packets which it transmits to test system controller 38 or any other desired system (not shown) coupled to IP network 40. Thus, as can be seen, not only can the DSL connectivity of each C modem 8 of DSLAM 10 be tested, but also the ability of each C modem 8 to convert analog DSL signals into Ethernet packets which can be transmitted to a specific address on IP network 40 for analysis, evaluation and/or to determine whether said C modem 8 is functioning properly.

While the use of an R modem 6' for testing C modems 8 of a DSLAM 10 as shown in FIG. 1 is technically effective, it is not cost effective. Accordingly, it is desirable to provide a lower cost solution to the R modem 6' associated with each DSLAM 10 for testing the C modems 8 thereof while providing the same level of functionality.

SUMMARY OF THE INVENTION

In one embodiment, a system is provided for testing a C-type modem of a digital subscriber line access multiplexer (DSLAM) which includes: a plurality of C-type modems each of which includes an Ethernet input/output port and a DSL input/output port and which is operative for converting Ethernet packets into DSL signals and vice versa, a switch matrix operative for individually coupling the DSL port of each C-type modem to a DSL test port of the DSLAM, and a first Ethernet switch operative for individually coupling an Ethernet line to an Ethernet test port of the DSLAM. The system includes a first test unit which includes an Ethernet input/output port and a DSL input/output port and which is operative for converting Ethernet packets into DSL signals and vice versa, wherein the DSL port and the Ethernet port of the first test unit are communicatively coupled to the DSL and Ethernet test ports of the DSLAM, respectively; a second Ethernet switch coupled to the Ethernet line away from the first Ethernet switch of the DSLAM; an R-type modem which includes an Ethernet input/output port and a DSL input/output port and which is operative for converting Ethernet packets into DSL signals and vice versa; and a second test unit which includes an Ethernet input/output port and a DSL input/output port and which is operative for converting Ethernet packets into DSL signals and vice versa, wherein the DSL port of the R-type modem is communicatively coupled to the DSL port of the second test unit and the Ethernet port of the second test unit is communicatively coupled to the second Ethernet switch. The R-type modem is operative for outputting a first set of DSL signals to the DSL port of the second test unit. The second test unit is operative for converting the first set of DSL signals received at the DSL port thereof into the first set of Ethernet packets that are transmitted to the Ethernet port of the first test unit via the first and second Ethernet switches, the Ethernet line and the DSL test port of the DSLAM. The first test unit is operative for converting the first set of Ethernet packets received at the Ethernet port thereof into the first set of DSL signals which are output to the DSL port of one of the C-type modems via the switch matrix and the Ethernet test port of the DSLAM.

The C-type modem can be operative, in response to receipt of the first set of DSL signals from the first test unit, for transmitting a second set of DSL signals to the DSL port of the first test unit via the switch matrix and the DSL port of the DSLAM. The first test unit can be operative for converting the second set of DSL signals received at the DSL port thereof into a second set of Ethernet packets which are transmitted to the Ethernet port of the second test unit via the first and second Ethernet switches, the Ethernet line and the Ethernet test port of the DSLAM. The second test unit can be operative for converting the second set of Ethernet packets received at the Ethernet port thereof into the second set of DSL signals which are output to the DSL port of the R-type modem. The R-type modem can be operative, in response to receipt of the second set of DSL signals at the DSL port thereof, for transmitting via the DSL port thereof a third set of DSL signals to the DSL port of the second test unit.

Communication between the DSL ports of the R- and C-type modems can occur under the control of a system controller that can be communicatively coupled to the second Ethernet switch.

Each test unit can include a low pass filter operative for low pass filtering DSL signals received at or output by the DSL port of the test unit; an attenuator operative for attenuating incoming low pass filtered DSL signals; an amplifier/line driver operative for amplifying outgoing DSL signals; a splitter operative for directing incoming low pass filtered DSL signals to the attenuator and for directing amplified outgoing DSL signals to the low pass filter; a digital processing system; an analog-to-digital (A-to-D) converter operative for converting attenuated and low pass filtered DSL signals into corresponding digital data for input to the digital processing unit; and a digital-to-analog (D-to-A) converter operative for converting digital data output by the digital processing unit into corresponding analog signals for output to the amplifier/line driver. The digital processing system can be operative for converting the digital data received from the A-to-D converter into one or more Ethernet packet(s) that is output by the Ethernet port of the test unit. The digital processing system can be operative for converting one or more Ethernet packet(s) received at the Ethernet port of the test unit into the digital data that is output to the D-to-A converter.

The digital processing system can include a decimator operative for decimating the digital data output by the A-to-D converter; a compressor operative for compressing the decimated digital data into lower resolution digital data; a receive data buffer operative for collecting compressed digital data output by the compressor; a controller operative for causing the receive data buffer to output the compressed digital data and for forming the compressed digital data into a digital Ethernet packet; and an Ethernet physical interface operative for converting the digital Ethernet packet into the Ethernet packet output via the Ethernet port of the test unit.

The decimator, the compressor and the receive data buffer can be implemented, along with other functions, as part of single integrated circuit chip, such as a field programmable gate array (FPGA).

The digital processing system can include an Ethernet physical interface operative for converting Ethernet packets received at the Ethernet port of the test unit into digital Ethernet packets; a controller operative for converting the digital Ethernet packet into compressed digital data; a transmit data buffer operative for collecting compressed digital data output by the controller; and an expander for expanding the compressed digital data into higher resolution digital data which is output to the D-to-A converter.

The transmit data buffer and the expander can be implemented, along with other functions, as part of a single integrated circuit chip, such as a field programmable gate array (FPGA).

In another embodiment, a system is provided for testing a modem of a digital subscriber line access multiplexer (DSLAM), the DSLAM includes a plurality of modems each of which includes an Ethernet input/output port and a DSL input/output port and which can be operative for converting Ethernet packets into DSL signals and vice versa, a switch matrix operative for individually coupling the DSL port of each modem to a DSL test port of the DSLAM, and a first Ethernet switch operative for individually coupling an Ethernet line to an Ethernet test port of the DSLAM. The system includes a first modem which includes an Ethernet input/output port and a DSL input/output port and which can be operative for converting Ethernet packets into DSL data and vice versa; a first test unit for converting a first set of DSL data output by the first type modem into a first set of Ethernet packets for passage over an Ethernet network to the Ethernet switch of the DSLAM; and a second test unit for converting the first set of Ethernet packets received at the Ethernet switch of the DSLAM after passage over the Ethernet network into the first set of DSL data for passage to the DSL port of a modem of the DSLAM via the DSL port of the DSLAM.

In response to the first set of DSL data from the second test unit, the modem of the DSLAM can output via its DSL port a second set of DSL data that is received by the first modem after conversion from the second set of DSL data to a second set of Ethernet packets, which pass over the Ethernet network, and then back to the second set of DSL data by the second and first test units, respectively.

The Ethernet network can include another Ethernet switch communicatively coupled to the Ethernet port of the first test unit; and an Ethernet line communicatively coupled to the Ethernet switch of the DSLAM and the other Ethernet switch.

Each test unit can include means for converting the first set of DSL data into corresponding digital data; means for reducing the corresponding digital data into lower resolution digital data means for compressing the lower resolution digital data; and means for converting the compressed digital data into a corresponding Ethernet packet which is output via the Ethernet port of the test unit.

Each test unit can include means for converting Ethernet packets received at the Ethernet port of the test unit into corresponding digital data; means for expanding the corresponding digital data into higher resolution digital data; and means for converting the higher resolution digital data into DSL data which is output via the DSL port of the test unit.

In another embodiment, a method is provided for testing a modem of a digital subscriber line access multiplexer (DSLAM). The method includes (a) outputting a first set of DSL signals from a first modem; (b) converting the first set of DSL signals into a first set of Ethernet packets; (c) outputting the first set of Ethernet packets to an Ethernet network; (d) converting the first set of Ethernet packets output in step (c) into another instance of the first set of DSL signals; and (e) providing the first set of DSL signals of step (d) to a second modem.

The method can further include (f) outputting a second set of DSL signals from the second modem; (g) converting the second set of DSL signals into a second set of Ethernet packets; (h) outputting the second set of Ethernet packets to the Ethernet network; (i) converting the second set of Ethernet packets output in step (h) into another instance of the second set of DSL signals; and (j) providing the second set of DSL signals of step (i) to the first modem.

The first and second sets of DSL signals can either be the same or different. The first and second sets of Ethernet packets can either be the same or different.

The Ethernet network can include an Ethernet switch and an Ethernet line communicatively coupled between the first and second modems.

Each modem can be operative for converting DSL signals into Ethernet packets and vice versa.

Each DSL signal can be output over a DSL line comprised of a pair of copper wires. Each Ethernet packet can be output over an Ethernet line of any suitable and/or desirable type, such as, without limitation, an unshielded twisted pair.

In another embodiment, a method is provided for testing a modem of a digital subscriber line access multiplexer (DSLAM). In the method, a pair of modems is communicatively coupled to each other by way of a communications path that includes a first DSL communication medium connected to one modem, a second DSL communication medium connected to the other modem, which is associated with the DSLAM, and an Ethernet medium connected between the first and second DSL mediums. First DSL signals can be dispatched from the first modem via the first DSL communication medium for receipt by the second DSL modem via the second DSL communication medium, whereupon, between the first and second DSL communication mediums, the first DSL signals are converted into Ethernet packets for transmission over the Ethernet medium. Also or alternatively, second DSL signals can be dispatched from the second modem via the second DSL communication medium for receipt by the first DSL modem via the first DSL communication medium, whereupon, between the second and first DSL communication mediums, the second DSL signals are converted into Ethernet packets for transmission over the Ethernet medium.

DETAILED DESCRIPTION OF THE INVENTION

The following description will be made with reference to the accompanying figures where like reference numbers correspond to like elements.

Figure 2:
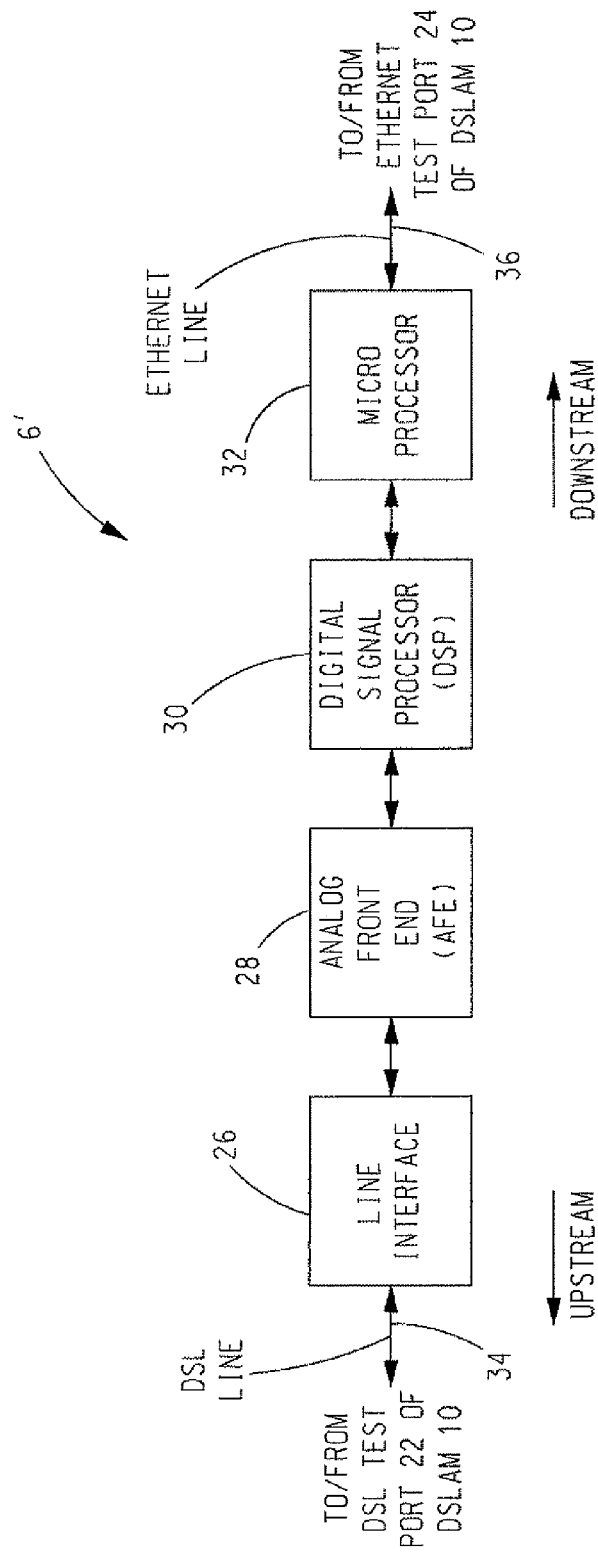
FIG. 2 is a schematic drawing of the internal blocks of each R-type modem block shown in FIG. 1.
Figure 3:
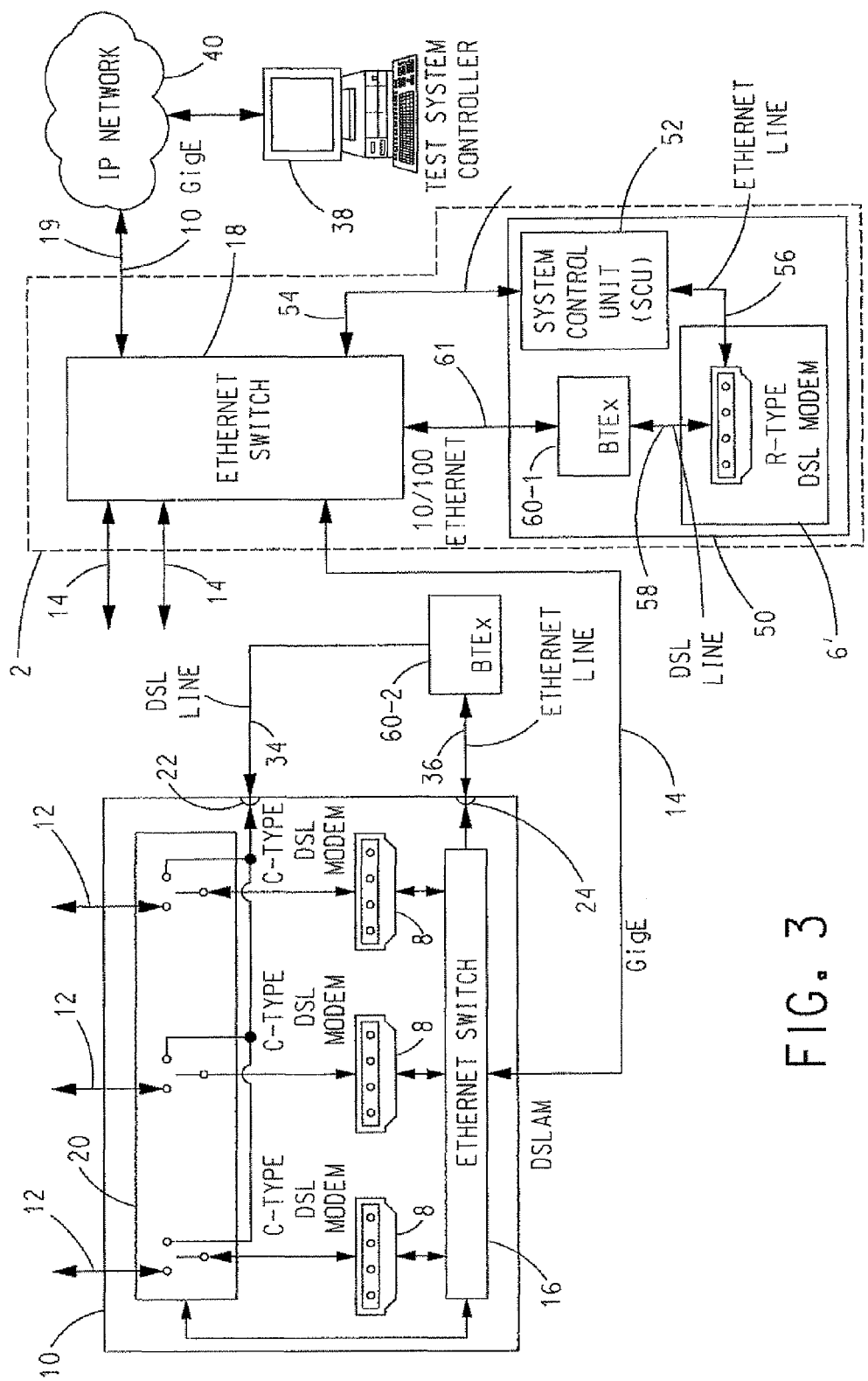
FIG. 3 is a schematic drawing of a system for testing one or more C-type modems of a digital subscriber line access multiplexer (DSLAM) with a single R-type disposed at a central location, such as the central office.

With reference to FIG. 3 and with reference back to FIGS. 1 and 2, an R modem 6' is disposed desirably within CO 2. More specifically, R modem 6' is incorporated into a test head 50 which is desirably part of CO 2. However, the provisioning of test head 50 within CO 2 is not to be construed as limiting the invention.

Test head 50 includes a system control unit (SCU) 52 that is coupled to Ethernet switch 18 and R modem 6' via Ethernet lines 54 and 56, respectively. SCU 52 functions as a hardware firewall and a resource manager for connecting test system controller 38 to R modem 6' of test head 50. A DSL line 58 connects the DSL port of R modem 6' to a Broadband Services Unit Test Extension (BTEx) 60-1, the details of which will be described in greater detail hereinafter in connection with FIG. 4.

BTEx 60-1 is operative for converting DSL data received on DSL line 58 from R modem 6' into Ethernet packets which are transmitted to Ethernet switch 16 of DSLAM 10 via Ethernet line 61, Ethernet switch 18 and Ethernet line 14. BTEx 60-1 is also operative for converting Ethernet packets received on Ethernet line 61 into DSL data which are transmitted to the DSL port of R modem 6'.

The packets of data supplied to Ethernet switch 18 via Ethernet line 61 are switched by Ethernet switch 18 to Ethernet switch 16 of a desired DSLAM 10. Since the switching of Ethernet packets described herein occurs in a manner well-known in the art of Ethernet protocol, details regarding such switching will not be described herein for purposes of simplicity.

The Ethernet packets received by switch matrix 20 via Ethernet switches 16 and 18 cause switch matrix 20 to connect a desired C modem 8 to DSL test port 22. Connected between the DSL test port 22 and the Ethernet test port 24 of the desired DSLAM 10 is another BTEx 60-2 that is similar to BTEx 60-1. Some or all of the Ethernet packets received from BTEx 60-1 by Ethernet switch 16 of DSLAM 10 are switched thereby to BTEx 60-2 via Ethernet line 36. In response to receiving Ethernet packets from Ethernet switch 16 via Ethernet line 36, BTEx 60-2 outputs corresponding analog DSL signals to the C modem 8 coupled to DSL test port 22 via DSL line 34. The DSL signals output on DSL line 34 can include signals that establish DSL connectivity between BTEx 60-2 and the C modem 8 connected to DSL test port 22, and/or can convey data to said C modem 8 for conversion into Ethernet packets which are routed thereby to test system controller 38 or another system (not shown) communicatively coupled to Ethernet line 19.

As can be seen from FIG. 3, the use of BTEx 60-1 and BTEx 60-2 avoids the need to have a dedicated R modem 6' associated with each DSLAM 10.

Figure 1A:
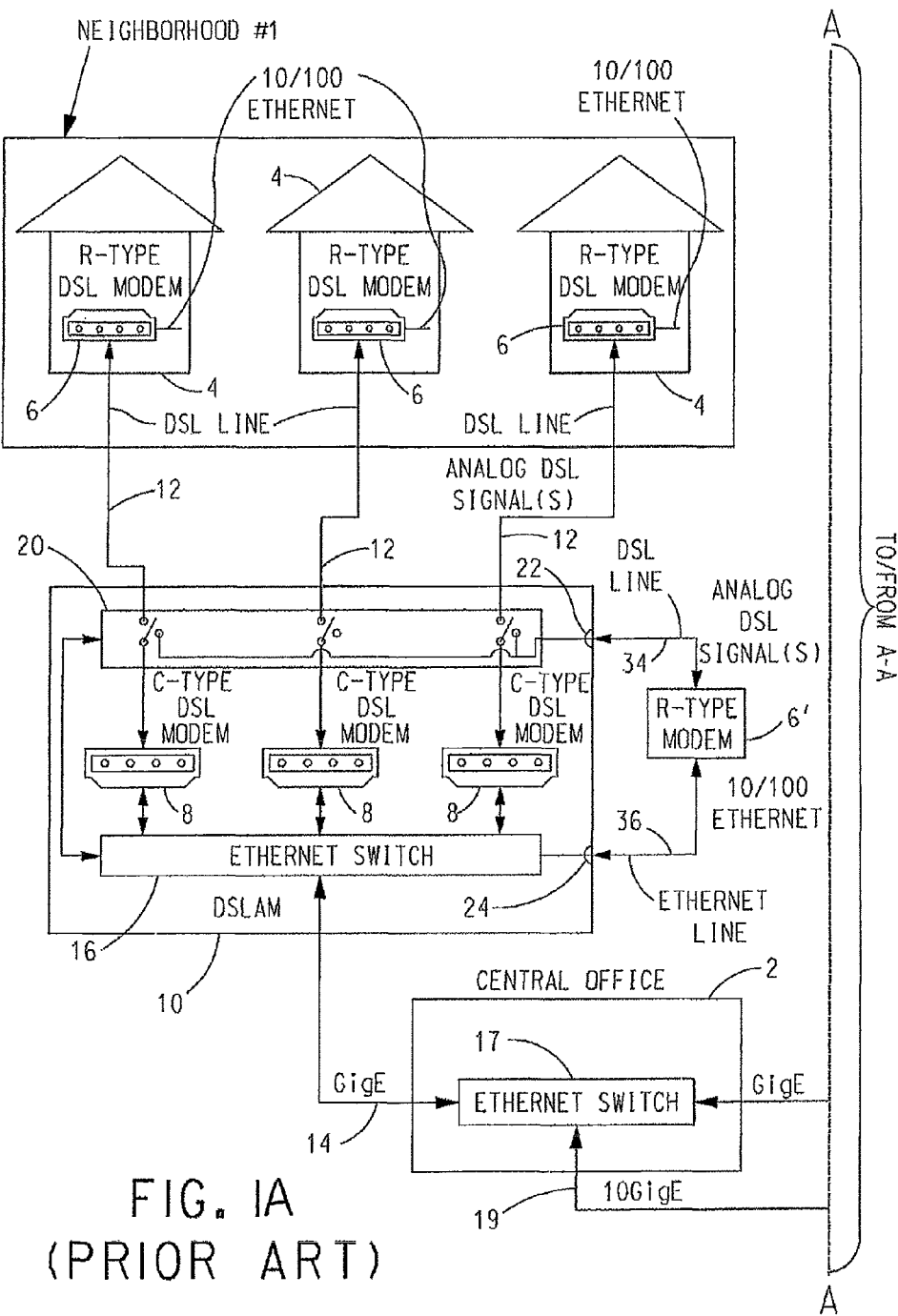
FIG. 1 is a schematic drawing of a prior art architecture for distributing DSL signals from a central office of a service provider to each of a plurality of customers, including R-type modems disposed in the manner of the prior art for testing said architecture.
Figure 1B:
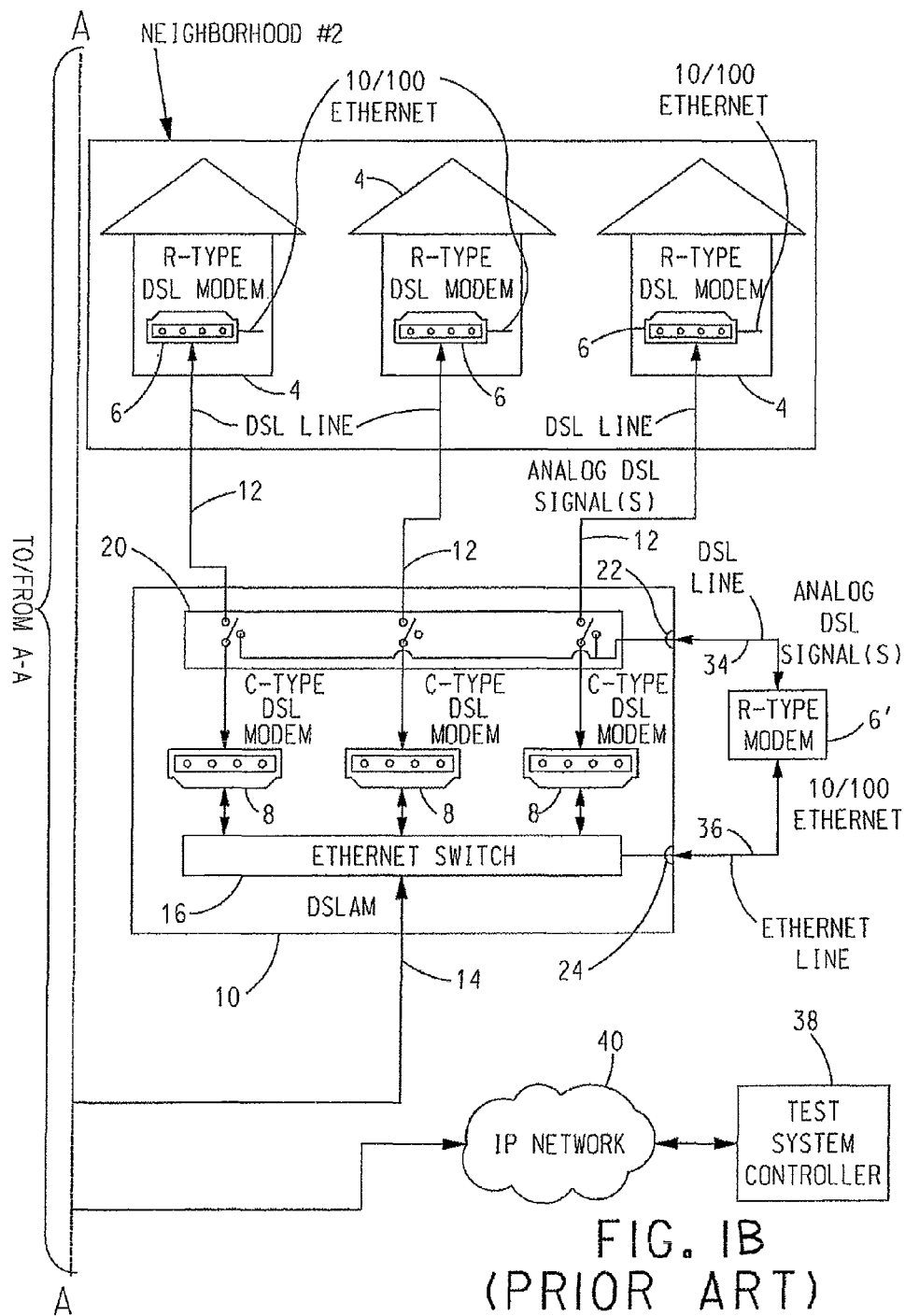
Figure 4:
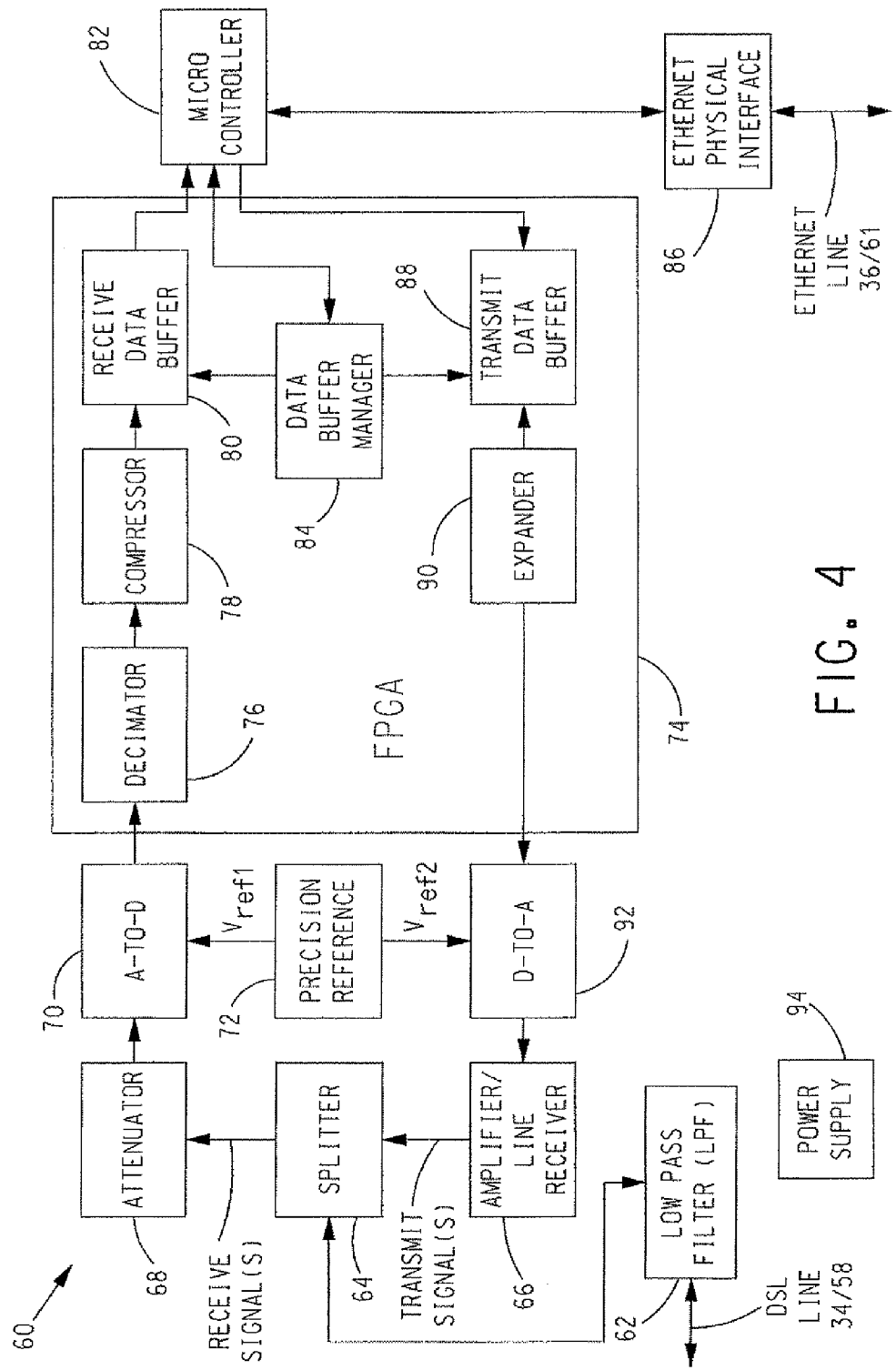
FIG. 4 is a schematic drawing of the internal blocks of each test unit (BTEx) shown in FIG. 3.

With reference to FIG. 4 and with continuing reference to FIGS. 1-3, each BTEx 60 includes a low pass filter (LPF) 62 configured to low pass filter signals received from or transmitted to the corresponding DSL line 34 or 58. Each BTEx 60 also includes a splitter 64, desirably implemented as a so-called two wire/four wire hybrid. Splitter 64 is operative for conveying transmit signals received from an amplifier/line driver 66 of BTEx 60 to low pass filter 62 for transmission on DSL line 34 or 58, depending upon whether BTEx 60 is being used as BTEx 60-1 or BTEx 60-2. Splitter 64 is also operative for conveying signals received from low pass filter 62 to an attenuator 68 of BTEx 60. Attenuator 68 is operative for adjusting, e.g., reducing, the signal strength of signals received from splitter 64 to a level such that an analog-to-digital converter (A-to-D) 70 of BTEx 60, coupled to the output of attenuator 68, is driven near full level and that signal clipping occurs at an acceptable rate. The full scale input of A-to-D 70 is set by a reference voltage $V_{ref1}$ which is generated by a precision reference 72.

A-to-D 70 operates under the control of a field programmable gate array (FPGA) 74 which configures A-to-D 70 and extracts digitized data therefrom.

In one non-limiting embodiment, A-to-D 70 over-samples the analog signal received from attenuator 68 at a resolution of 16 bits per sample. This digital data is then read by FPGA 74.

The digital data extracted from A-to-D 70 is processed by a decimator block 76 of FPGA 74. Decimator block 76 is operative for reducing the effective sampling rate of the digital data received from A-to-D 70 and for outputting a lower samples/sec data rate to a compressor block 78 of FPGA 74.

Compressor block 78 is operative for converting the decimated digital data received from decimator 76 into lower bit resolution data samples. Collectively, decimator 76 and compressor 78 lower the amount of data to be transported over the corresponding Ethernet line 36 or 61 of BTEx 60-2 or BTEx 60-1, respectively.

FPGA 74 includes a receive data buffer 80 that is operative for collecting plural data samples output by compressor 78 and for passing the plural collected data samples to a microcontroller 82 of BTEx 60 when a predetermined number of data samples have been collected. Receive data buffer 80 operates under the control of a data buffer manager 84 which is operative for controlling the collection of data samples by receive data buffer 80.

In operation, data buffer manager 84 keeps track of the number of data samples collected in received data buffer 80. Microcontroller 82 periodically queries data buffer manager 84 for the current number of samples contained in received data buffer 80. If a predetermined number of data samples have not been collected in received data buffer 80, microcontroller 82 delays extracting the data samples stored in received data buffer 80. However, when the predetermined number of data samples have been collected, microcontroller 82 extracts the data samples from received data buffer 80 and forms therefrom a data packet, e.g., a user datagram protocol (UDP) packet. Multiple extractions of data samples from received data buffer 80 are typically required to form a complete UDP packet. However, this is not to be construed as limiting the invention.

Microcontroller 82 implements a media access control (MAC) which forms an Ethernet packet from the formed data packet. This Ethernet packet is formed in such a way that it is addressed for a desired destination BTEx 60. Thus, if the BTEx 60 of FIG. 4 is BTEx 60-1, the Ethernet packet formed by microcontroller 82 is addressed for BTEx 60-2. Similarly, if the BTEx 60 of FIG. 4 is BTEx 60-2, the Ethernet packet formed by microcontroller 82 is addressed for BTEx 60-1. The address for each destination BTEx 60 can come from data embedded in DSL signal(s) received from the appropriate DSL line 34 or 58. However, this is not to be construed as limiting the invention as it is envisioned that the address of each destination BTEx 60 can be provisioned in any suitable and/or desirable manner. Each Ethernet packet prepared by microcontroller 82 is output to an Ethernet physical interface 86 which is operative for converting the Ethernet packet into an analog waveform that drives the corresponding Ethernet line 36 or 61.

Having described the flow of data through BTEx 60 from DSL line 34 or 58 to Ethernet line 36 or 61, respectively, (the received path) the flow of data through BTEx 60 from Ethernet line 36 or 61 to DSL line 34 or 58, respectively, (the transmit path) will now be described.

Ethernet/IP packets received at Ethernet physical interface 86 are converted thereby from analog Ethernet signals into corresponding packets of digital data which are conveyed to microcontroller 82.

Via the media access control (MAC) function implemented thereby, microcontroller 82 determines if the packets received from Ethernet physical interface 86 are intended for processing by microcontroller 82. If so, the digital data is removed from the data packet and written to a transmit data buffer 88 of FPGA 74 operating under the control of data buffer manager 84.

Under the control of data buffer manager 84, transmit data buffer 88 accumulates a predetermined number of data samples prior to outputting said data samples to an expander block 90 of FPGA 74. This accumulation of data is used to compensate for transport time latency and jitter of data arriving on Ethernet line 36 or 61.

Via data buffer manager 84, microcontroller 82 monitors transmit data buffer 88 to determine if its accumulation of data samples is approaching predetermined low or high limits. If so, microcontroller 82 commands data buffer manager 84 to adjust the timing of the accumulation of data samples by transmit data buffer 88 and the output of said accumulated data samples by transmit data buffer 88 such that said timing remains within acceptable tolerances, thereby preventing underflow or overflow of transmit data buffer 88.

When transmit data buffer 88 contains the predetermined number of samples, microcontroller 82 causes such samples to be output to expander block 90 which is operative for performing the inverse function of compressor block 78. Namely, expander block 90 expands lower bit resolution digital samples into higher bit resolution digital samples. These higher bit digital resolution samples are then output to digital-to-analog converter (D-to-A) 92 operating under the control of FPGA 74.

D-to-A 92 reconstructs the digital bits input into it by expander 90 into an analog waveform. The maximum output level of D-to-A 92 is set by a reference voltage $V_{ref2}$ output by precision reference 72. Desirably, the values of $V_{ref1}$ and $V_{ref2}$ are the same. However, this is not to be construed as limiting the invention.

The analog output of D-to-A 92 is supplied to amplifier/line driver 66 which is operative for buffering the analog signal and providing impedance matching to the characteristic impedance of the cable that connects amplifier/line driver 66 to splitter 64.

Amplifier/line driver 66 outputs its buffered analog signal to splitter 64 which is operative for conveying the buffered analog signals to low pass filter (LPF) 62 for low pass filtering and output to the corresponding DSL line 34 or 58.

Each BTEx 60 also includes a power supply 94 which is operative for supplying the required electrical power to power the various components of BTEx 60.

Having described the various elements of each BTEx 60, an exemplary, non-limiting operation of test head 50 (including R modem 6') BTEx 60-1 and BTEx 60-2 will now be described with reference to FIG. 3.

At a suitable time, Ethernet data is conveyed to R modem 6' of test head 50 by test system controller 38 via Ethernet lines 19, 54, 56, Ethernet switch 18 and SCU 52. R modem 6' outputs analog DSL signal(s), that may include the data received by R modem 6' from test system controller 38, to BTEx 60-1. BTEx 60-1 digitizes the analog DSL signal received from R modem 6' and packages the digitized signal into Ethernet packet(s) for transport to BTEx 60-2 over the Ethernet network comprised of Ethernet line 61, Ethernet switch 18, Ethernet line 14, Ethernet switch 16 and Ethernet line 36. BTEx 60-2 recovers the data within the received Ethernet packet(s) and reconstructs the DSL analog waveform captured by BTEx 60-1. The reconstructed analog DSL analog waveform is transmitted by BTEx 60-2 to the C modem 8 coupled to DSL line 34 via DSL test port 22.

The C modem 8 under test decodes the analog DSL signals input into it and responds by transmitting out analog DSL signals that are received by BTEx 60-2.

The DSL signals received by BTEx 60-2 from the C modem 8 under test are digitized and packaged into Ethernet packet(s) by BTEx 60-2 for transport over the Ethernet network comprised of Ethernet switch 16, Ethernet line 14, Ethernet switch 18 and Ethernet line 61 for receipt by BTEx 60-1. BTEx 60-1 recovers the data within the Ethernet packet(s) and reconstructs therefrom the analog DSL signals that were captured by BTEx 60-2 for transmission to R modem 6' of test head 50.

R modem 6' decodes the analog DSL signals received from BTEx 60-1 and responds by transmitting back suitable response DSL signal(s) to C modem 8 under test via BTEx 60-1 and BTEx 60-2 and the Ethernet network comprised of Ethernet line 61, Ethernet switch 16, Ethernet line 14 and Ethernet switch 18, thereby establishing connectivity between R modem 6' and the C modem 8 under test.

The transmission and receipt of DSL signals between R modem 6' and the C modem 8 under test happens simultaneously and continuously while they are connected via BTEx 60-1, BTEx 60-2 and the Ethernet network therebetween. All signals between R modem 6' and the C modem 8 under test are handled continuously and in the same manner by BTEx 60-1 and BTEx 60-2 thereby allowing R modem 6' and the C modem 8 under test to remain connected via the virtual analog DSL path created by the BTEx 60-1 and BTEx 60-2 until the path is terminated by test system controller 38.

BTEx 60-1 and BTEx 60-2 compress analog signals received from the attached modems 6' and 8, respectively, such that only a fraction of the total network bandwidth is required for transporting the encoded analog DSL signals.

As can be seen, the use of BTEx 60-1 and BTEx 60-2 enables a centrally located R modem 6' to test a C modem 8 in any DSLAM 10 accessible to CO 2. As a result, a significant savings in hardware and cost is realized over the architecture shown in FIG. 1 wherein a dedicated R modem 6' is coupled to each DSLAM 10.

The present invention has been described with reference to the preferred embodiment. Obvious modifications and alterations will occur to others upon reading and understanding the preceding detailed description. For example, while the present invention has been described in connection with the use of Ethernet switches, e.g., Ethernet switches 16 and 18, and Ethernet lines, e.g., Ethernet lines 14 and 19, this is not to be construed as limiting the invention as it is envisioned that each switch and each line can be of any suitable and/or desirable type that provides a physical transport having sufficient bandwidth, e.g., ATM. It is intended that the invention be construed as including all such modifications and alterations insofar as they come within the scope of the appended claims or the equivalents thereof.

The invention claimed is:

1. A system for testing a C-type modem of a digital subscriber line access multiplexer (DSLAM), the DSLAM including a plurality of C-type modems, each of which includes an Ethernet input/output port and a DSL input/output port and which is operative for converting Ethernet packets into DSL signals and vice versa, a switch matrix operative for individually coupling the DSL port of each C-type modem to a DSL test port of the DSLAM, and a first Ethernet switch operative for individually coupling an Ethernet line to an Ethernet test port of the DSLAM, the system comprising:

a first test unit which includes an Ethernet input/output port and a DSL input/output port and which is operative for converting Ethernet packets into DSL signals and vice versa, wherein the DSL port and the Ethernet port of the first test unit are communicatively coupled to the DSL and Ethernet test ports of the DSLAM, respectively;

a second Ethernet switch coupled to the Ethernet line away from the first Ethernet switch of the DSLAM;

an R-type modem which includes an Ethernet input/output port and a DSL input/output port and which is operative for converting Ethernet packets into DSL signals and vice versa; and a second test unit which includes an Ethernet input/output port and a DSL input/output port, and which is operative for converting Ethernet packets into DSL signals and vice versa, wherein the DSL port of the R-type modem is communicatively coupled to the DSL port of the second test unit and the Ethernet port of the second test unit is communicatively coupled to the second Ethernet switch, wherein:

the R-type modem is operative for outputting a first set of DSL signals to the DSL port of the second test unit;

the second test unit is operative for converting the first set of DSL signals received at the DSL port thereof into the first set of Ethernet packets that are transmitted to the Ethernet port of the first test unit via the first and second Ethernet switches, the Ethernet line and the Ethernet test port of the DSLAM; and the first test unit is operative for converting the first set of Ethernet packets received at the Ethernet port thereof into the first set of DSL signals which are output to the DSL port of one of the C-type modems via the switch matrix and the DSL test port of the DSLAM.

2. The system of claim 1, wherein:

the C-type modem is operative, in response to receipt of the first set of DSL signals from the first test unit, for transmitting a second set of DSL signals to the DSL port of the first test unit via the switch matrix and the DSL port of the DSLAM;

the first test unit is operative for converting the second set of DSL signals received at the DSL port thereof into a second set of Ethernet packets which are transmitted to the Ethernet port of the second test unit via the first and second Ethernet switches, the Ethernet line and the Ethernet test port of the DSLAM;

the second test unit is operative for converting the second set of Ethernet packets received at the Ethernet port thereof into the second set of DSL signals which are output to the DSL port of the R-type modem; and the R-type modem is operative, in response to receipt of the second set of DSL signals at the DSL port thereof, for transmitting via the DSL port thereof a third set of DSL signals to the DSL port of the second test unit.

3. The system of claim 2, wherein communication between the DSL ports of the R- and C-type modems occurs under the control of a system controller that is communicatively coupled to the second Ethernet switch.

4. The system of claim 2, wherein each test unit includes:

a low pass filter operative for low pass filtering DSL signals received at or output by the DSL port of the test unit;

an attenuator operative for attenuating incoming low pass filtered DSL signals;

an amplifier/line driver operative for amplifying outgoing DSL signals;

a splitter operative for directing incoming low pass filtered DSL signals to the attenuator and for directing amplified outgoing DSL signals to the low pass filter;

a digital processing system;

an analog-to-digital (A-to-D) converter operative for converting attenuated and low pass filtered DSL signals into corresponding digital data for input to the digital processing system; and a digital-to-analog (D-to-A) converter operative for converting digital data output by the digital processing system into corresponding analog signals for output to the amplifier/line driver, wherein:

the digital processing system is operative for converting the digital data received from the A-to-D converter into one or more Ethernet packet(s) that is output by the Ethernet port of the test unit; and the digital processing system is operative for converting one or more Ethernet packet(s) received at the Ethernet port of the test unit into the digital data that is output to the D-to-A converter.

5. The system of claim 4, wherein the digital processing system includes:

a decimator operative for decimating the digital data output by the A-to-D converter;

a compressor operative for compressing the decimated digital data into lower resolution digital data;

a receive data buffer operative for collecting compressed digital data output by the compressor;

a controller operative for causing the receive data buffer to output the compressed digital data and for forming the compressed digital data into a digital Ethernet packet; and a Ethernet physical interface operative for converting the digital Ethernet packet into the Ethernet packet output via the Ethernet port of the test unit.

6. The system of claim 5, wherein the decimator, the compressor and the receive data buffer are implemented in a field programmable gate array (FPGA).

7. The system of claim 4, wherein the digital processing system includes:

an Ethernet physical interface operative for converting Ethernet packets received at the Ethernet port of the test unit into digital Ethernet packet;

a controller operative for converting the digital Ethernet packet into compressed digital data; and a transmit data buffer operative for collecting compressed digital data output by the controller; and an expander for expanding the compressed digital data into higher resolution digital data which is output to the D-to-A converter.

8. The system of claim 7, wherein the transmit data buffer and the expander are implemented in a field programmable gate array (FPGA).

9. A system for testing a modem of a digital subscriber line access multiplexer (DSLAM), the DSLAM including a plurality of modems, each of which includes an Ethernet input/output port and a DSL input/output port and which is operative for converting Ethernet packets into DSL signals and vice versa, a switch matrix operative for individually coupling the DSL port of each modem to a DSL test port of the DSLAM, and a first Ethernet switch operative for individually coupling an Ethernet line to an Ethernet test port of the DSLAM, the system comprising:

a first modem which includes an Ethernet input/output port and a DSL input/output port and which is operative for converting Ethernet packets into DSL data and vice versa;

a first test unit for converting a first set of DSL data output by the first type modem into a first set of Ethernet packets for passage over an Ethernet network to the first Ethernet switch of the DSLAM; and a second test unit for converting the first set of Ethernet packets received at the first Ethernet switch of the DSLAM after passage over the Ethernet network into the first set of DSL data for passage to the DSL port of a modem of the DSLAM via the DSL port of the DSLAM.

10. The system of claim 9, wherein, in response to the first set of DSL data from the second test unit, the modem of the DSLAM outputs via its DSL port a second set of DSL data that is received by the first modem after conversion from the second set of DSL data to a second set of Ethernet packets, which pass over the Ethernet network, and then back to the second set of DSL data by the second and first test units, respectively.

11. The system of claim 9, wherein the Ethernet network includes:
  another Ethernet switch communicatively coupled to the Ethernet port of the first test unit; and
  the Ethernet line communicatively coupled to the Ethernet switch of the DSLAM and the other Ethernet switch.

12. The system of claim 9, wherein each test unit includes:
  means for converting the first set of DSL data into corresponding digital data;
  means for reducing the corresponding digital data into lower resolution digital data;
  means for compressing the lower resolution digital data; and
  means for converting the compressed digital data into a corresponding Ethernet packet which is output via the Ethernet port of the test unit.

13. The system of claim 9, wherein each test unit includes:
  means for converting Ethernet packets received at the Ethernet port of the test unit into corresponding digital data;
  means for expanding the corresponding digital data into higher resolution digital data; and
  means for converting the higher resolution digital data into DSL data which is output via the DSL port of the test unit.

14. A method of testing a modem of a digital subscriber line access multiplexer (DSLAM) comprising:
  (a) outputting a first set of DSL signals from a first modem;
  (b) converting the first set of DSL signals into a first set of Ethernet packets;
  (c) outputting the first set of Ethernet packets to an Ethernet network;
  (d) converting the first set of Ethernet packets output in step (c) into another instance of the first set of DSL signals; and
  (e) providing the first set of DSL signals of step (d) to a second modem.

15. The method of claim 14, further including:
  (f) outputting a second set of DSL signals from the second modem;
  (g) converting the second set of DSL signals into a second set of Ethernet packets;
  (h) outputting the second set of Ethernet packets to the Ethernet network;
  (i) converting the second set of Ethernet packets output in step (h) into another instance of the second set of DSL signals; and
  (j) providing the second set of DSL signals of step (i) to the first modem.

16. The method of claim 15, wherein:
  the first and second sets of DSL signals are either the same or different; and
  the first and second sets of Ethernet packets are either the same or different.

17. The method of claim 15, wherein the Ethernet network includes an Ethernet switch and an Ethernet line communicatively coupled between the first and second modems.

18. The method of claim 15, wherein each modem is operative for converting DSL signals into Ethernet packets and vice versa.

19. The method of claim 15, wherein:
  each DSL signal is output over a DSL line comprised of a pair of copper wires; and
  each Ethernet packet is output over an Ethernet line.

20. A method of testing a modem of a digital subscriber line access multiplexer (DSLAM) comprising:
  providing a pair of modems communicatively coupled to each other by way of a communications path that includes a first DSL communication medium connected to the one modem, a second DSL communication medium connected to the other modem which is associated with the DSLAM, and an Ethernet medium connected between the first and second DSL communication mediums; and at least one of:
  dispatching first DSL signals from the first modem via the first DSL communication medium for receipt by the second DSL modem via the second DSL communication medium, whereupon, between the first and second DSL communication mediums, the first DSL signals are converted into Ethernet packets for transmission over the Ethernet medium; and/or
  dispatching second DSL signals from the second modem via the second DSL communication medium for receipt by the first DSL modem via the first DSL communication medium, whereupon, between the second and first DSL communication mediums, the second DSL signals are converted into Ethernet packets for transmission over the Ethernet medium.

* * * * *

UNITED STATES PATENT AND TRADEMARK OFFICE
CERTIFICATE OF CORRECTION

PATENT NO. : 8,401,061 B2 Page 1 of 1
APPLICATION NO. : 12/307824
DATED : March 19, 2013
INVENTOR(S) : Gibala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this
First Day of September, 2015

Michelle K. Lee
*Director of the United States Patent and Trademark Office*